Nov. 17, 1936.    J. A. RHEINSTROM    2,061,089
FILTERMASSE WASHER
Filed Oct. 26, 1934
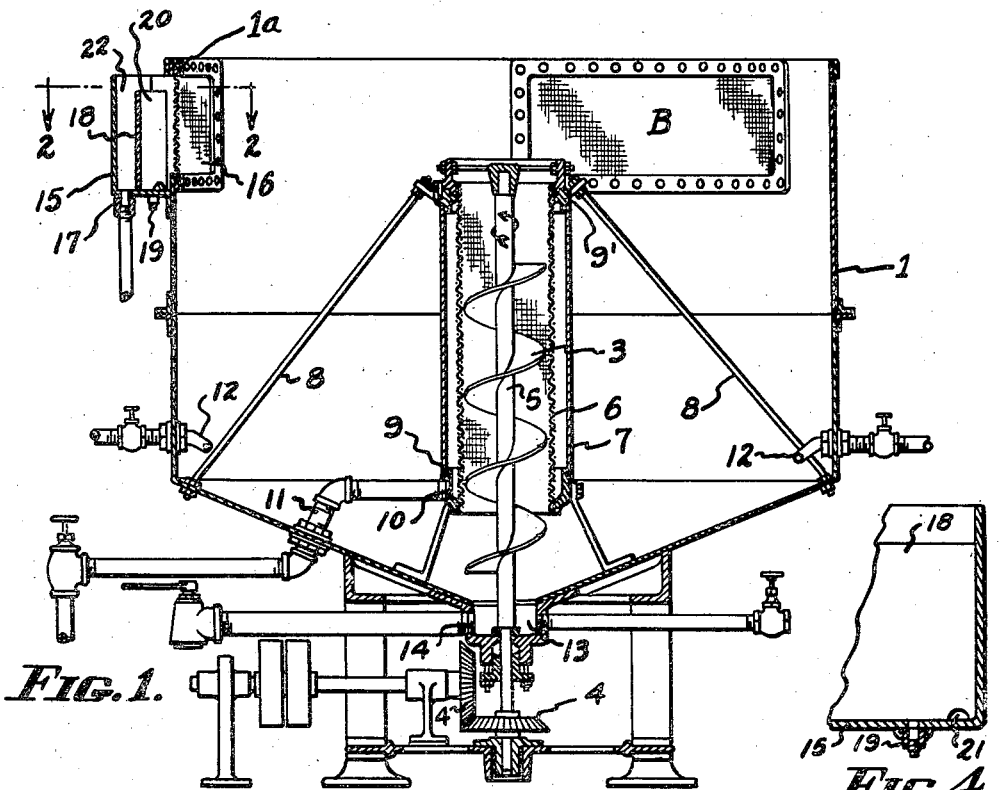
FIG.1.
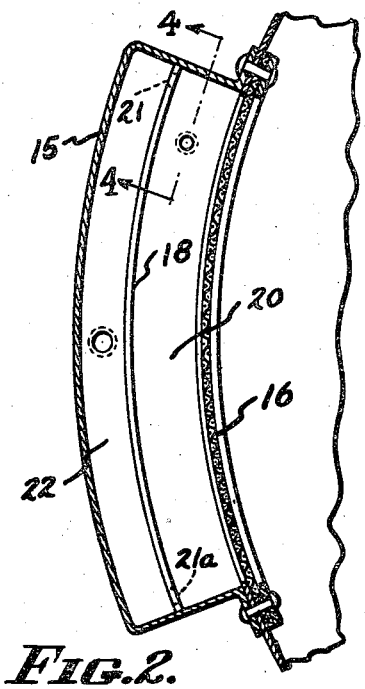
FIG.2.
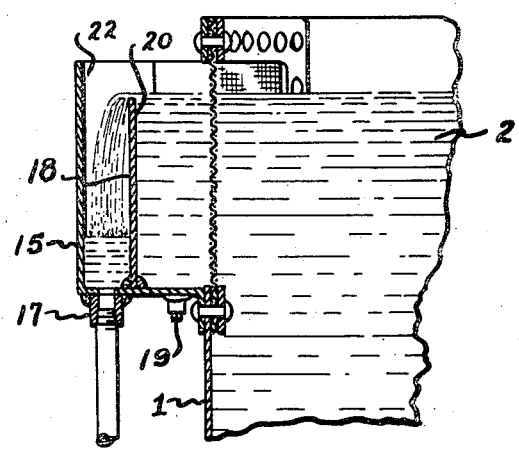
FIG.3.
FIG.4.
INVENTOR.
James A. Rheinstrom
BY Allen + Allen
ATTORNEYS.

Patented Nov. 17, 1936

2,061,089

UNITED STATES PATENT OFFICE 2,061,089

FILTERMASSE WASHER

James A. Rheinstrom, Cincinnati, Ohio, assignor to The Karl Kiefer Machine Company, Cincinnati, Ohio, a corporation of Ohio Application October 26, 1934, Serial No. 750,182

8 Claims. (Cl. 141—12)

My invention relates to filtermasse or to pulp washers for the washing of filtermasse, pulp or other similar matter by the introduction of a continuous flow of clean water into the filtermasse and the continuous removal of the dirty water. The type of washer described herein as illustrative of my invention is a type used for washing the filtermasse contained in a liquid filter. After filtering of the liquid, the filtermasse or pulp from the filter is removed and washed, pressed and then replaced in the filter and used again. However, I do not intend to limit myself to this specific type of washer, since my invention will apply equally well to numerous different types of washers for washing numerous different materials for numerous different purposes.

In the washing of filtermasse, it is the usual practice to flow the water into the mixture of filtermasse and water in a continuous flow, and to remove it from the mixture by means of an outlet guarded by a screen in order to permit the dirty water to flow out but to insure that the filtermasse itself will not flow out with the water. One of the greatest objections to this type of washing is that the suction or currents in the washer created by the water rapidly flowing out of the washer, and particularly around the outlet port, has a decided tendency to cake the filtermasse being washed against the screen and thus slow up the outflow of the dirty water. The disadvantage of this slowing up of the outflow is very apparent when it is considered that best washing is done by a continuous, steady flow of water through the washer, and this stopping up interrupts this flow, besides in some cases forcing the incoming water to overflow the container. As is also apparent, this slowing up greatly retards the whole process of washing, and thus slows up the plant as a whole.

It is an object of my invention to provide means which while permitting a rapid inflow and outflow of the water, will prevent the filtermasse from stopping up the screens by caking, etc.

It is a further object of my invention to provide means which, while accomplishing all of above, and at the same time aid in the removal of the dirty water from the top of the mixture.

It is another object of my invention to provide means which, while accomplishing all of the purposes described above, may be attached to or made a part of numerous different forms of washers at present on the market and in operation, without any very great amount of change or labor, and without any heavy added expense.

These and other objects of my invention which will be set forth hereinafter or will be apparent to one skilled in the art upon reading these specifications, I accomplish by that certain construction and arrangement of parts of which I shall now desire a preferred embodiment. Reference is now made to the drawing which forms a part thereof, and in which:

Figure 1 is a vertical section of a filtermasse washer showing my invention.

Figure 2 is a horizontal section of a portion of Figure 1 taken on the section line 2—2 of Figure 1.

Figure 3 is a portion of Figure 1 enlarged to show my invention.

Figure 4 is a section taken on the section line 4—4 of Figure 2.

Briefly, in the practice of my invention I provide a baffle plate, over which the wash water flows, between the screen and the outlet port. This prevents any suction or current due to the water flowing out of the port from being communicated to the wash water behind the screen and in the washer itself.

Referring to the drawing, 1 is the usual vat for holding the mixture 2 of water and filtermasse. There is a worm or screw 3 within the vat 1 which is rotatably driven on the shaft 5 by gears 4. Surrounding this worm 3 is a cylindrical screen 6 which in turn is surrounded by a cylindrical metal tube 7. These two cylinders are supported vertically within the vat 1 by the usual braces 8 and are spaced apart by annular collars 9 and 9'. The lower collar 9 has a port 10 communicating with the space between the cylinders 6 and 7 and a pipe 11 which leads outside of the vat 1 and to the drain. There are water inlet ports 12 placed around the side of the vat 1 for introducing the water continuously into the vat. These ports 12 may be placed at an angle in order to give a spinning or centrifugal motion to the water and the filtermasse within the vat. At the bottom of the vat 1, in a depression 13, are one or more ports 14 for draining the vat 1 of water and filtermasse. The screw 3 is revolved in such a direction that the mixture of filtermasse and water 2 is carried up through the cylinder 6 which is a screen, and the dirty water goes through the screen 6, flows down between the cylinders 6 and 7 and out of the outflow port 10 to the drain. The filtermasse is carried by this screw 3 up and over the collar 9', and then drops back into the vat 1 to be washed over again. That which I have heretofore described is a type of pulp washer and is not necessarily a part of this invention.

In practicing my invention I place a box-like tank or casing 15 in the side of the vat 1 and on a level with its upper rim 1a. The portion of the vat 1 communicating with the box 15 is cut away and replaced by a screen 16. The bottom of the box 15 and the screen 16 are below the water level of the vat 1, and the screen permits the water in the vat 1 to flow into the box 15, but keeps back the filtermasse. Toward the back side of the box 15 and in the bottom portion I place an outlet port 17. Between this outlet port 17 and the screen 16 I place a baffle plate 18, extending from one side of the box 15 to the other, and held in place by welding or any other method well known in the art. I also provide a drain plug 19 in the bottom of the box 15 in the space 20 between the screen and the baffle plate 18, for use in draining the compartment 20 for cleaning, etc. There are also two small apertures 21 and 21a in the lower portion of the baffle plate 18, which permit the water to flow from compartment 20 into compartment 22 when the box 15, screens, etc. are cleaned. These apertures 21 and 21a are so small that no suction or current in the fluid in compartment 22 will be communicated to the fluid in compartment 20.

In practicing my invention in connection with a washer as illustrated, I may provide two or more of these boxes 15 with the screen and the baffle plate. I have illustrated generally a second one of these at "B" in Figure 1.

In operation, the dirty water in the vat flows through the screen 16 and out into the compartment 20, the screen 16 preventing the filtermasse itself from flowing into this compartment. When the level of the water in the vat and the compartment 20 has become sufficiently high, the water in compartment 20 flows over the baffle plate 18 and into compartment 22, and hence out through the draining port 17. The suction created by the dirty water flowing out through the exhaust port 17 will create currents in the water contained in compartment 22, which would be sufficient to suck the pulp against the screen 16 if it were not for the baffle plate 18 which breaks up this current, since the water in compartment 20 must flow over this plate 18 in order to get to the compartment 22, and hence there is no connection whatever between the water in compartment 22 and the water in compartment 20 to carry currents from one to the other.

In actual operation there is a continuous flow of clean water into the vat 1 from the ports 12, and a continuous outflow of dirty water through the port 10 and the boxes 15. The incoming water is so controlled that the water is kept at a level slightly above the top edge of the baffle plate 18, and therefore the compartment 22 is usually filled up with a very small drop in the water flowing over the baffle plate 18.

In commercial operation a washer containing my invention will wash the filtermasse contained therein in about two hours or less, while in using the same washer without my invention, the washing of the same filtermasse will take approximately four or more hours. Therefore, the great advantage of my invention can be readily seen. The inflow and outflow of the water in my novel apparatus can be greatly increased, since the suction of the water rushing rapidly out of the outflow will not cause the filtermasse to cake up on the screens. By taking the water off at the top it is possible thereby to remove that portion of the dirt which is carried upward by the screw and fails to pass through cylindrical screen 6, as well as all floating dirt. Heretofore it has been difficult to do this, since the filtermasse being washed has a great tendency to float, and therefore the danger of caking up the screens is very much greater when taking water from this point.

My novel invention, as is apparent from its simple construction, may be placed on different kinds of vats for washing pulp or similar material without any decided change in the construction of the vat itself. In actual use one or more of these boxes with their baffle plates may be used. In the application illustrated in the drawing, I have shown two such boxes with a portion of the screens projecting above the water line in the vat; however, any number may be used, depending on the work to be done, and the screen as a whole may be below the water level with the baffle plate alone positioned so that its upper edge is at the water level, and I do not intend to limit myself to the specific number of boxes used or the position of the screen or the shape or type of the box itself. I also do not intend to limit myself to the type of baffle plate or the exact means used to accomplish my invention since it may be accomplished by numerous other constructions such as one or more pipes each surrounding a drain port and with their upper edges at water level.

It is to be understood that different forms of my preferred form may be made without departing from the spirit of my invention.

Having thus described my invention, what I claim as new and desire to secure by Letters Patent, is:—

1. A continuous flow pulp washer comprising a vat, inflow ports and outflow means, at least one of said outflow means comprising a box having a bottom and four sides, one of said sides being foraminated, said vat having a portion of its side wall cut away, said cut-away portion being of the same size as said foraminated side of said box, and said cut-away portion being positioned in said vat wall so that a portion will be above the water line of said vat, said box being fastened on the outside of said vat wall so that said foraminated side will register with said cut-away portion, an outlet port within the bottom of said box, and a baffle plate vertically placed across said box and connected to the sides thereof in sealed relationship between said outlet port and said foraminated side to divide the box into two chambers, the top edge of said baffle plate being at the water line of said vat.

2. A continuous flow pulp washer comprising a vat, inflow ports and outflow means, at least one of said outflow means comprising a box having a bottom and four sides, one of said sides being foraminated, said vat having a portion of its side wall cut away, said cut-away portion being of the same size as said foraminated side of said box, and said cut-away portion being positioned in said vat wall so that a portion will be above the water line of said vat, said box being fastened on the outside of said vat wall so that said foraminated side will register with said cut-away portion, an outlet port within the bottom of said box, and a baffle plate vertically placed across said box and connected to the sides thereof in sealed relationship between said outlet port and said foraminated side to divide the box into two chambers, the top edge of said baffle plate being at the water line of said vat, and a drain plug in the bottom of said box at a point between said baffle plate and said foraminated side.

3. A continuous flow pulp washer comprising a vat, inflow ports and outflow means, at least one of said outflow means comprising a box having a bottom and four sides, one of said sides being foraminated, said vat having a portion of its side wall cut away, said cut-away portion being of the same size as said foraminated side of said box, and said cut-away portion being positioned in said vat wall so that a portion will be above the water line of said vat, said box being fastened on the outside of said vat wall so that said foraminated side will register with said cut-away portion, an outlet port within the bottom of said box, and a baffle plate vertically placed across said box and connected to the sides thereof in sealed relationship between said outlet port and said foraminated side to divide the box into two chambers, the top edge of said baffle plate being at the water line of said vat, and small apertures in said baffle plate at a point where it contacts the bottom of said box.

4. A continuous flow pulp washer comprising a vat and inflow ports, a screen extending across an opening in the side wall of said vat, a box opening upwardly composed of two chambers divided by a wall, one of which has four walls and the other of which has three walls and an open side, placed on the outside of the wall of the vat so that the open portion will cover the screen, a portion of said box being above the water line of said vat, an exhaust port in said four walled chamber and the wall dividing the two chambers being substantially at the water line of said vat.

5. An outlet casing for a continuous flow pulp washer vat comprising a box having an open top and an open side wall and divided by a wall into two chambers, the said open side of one of said chambers being closed by a screen, an outlet port in the other chamber, said dividing wall being slightly less than the height of the sides of the box and having its top edge considerably above the bottom edge of the screen, said box being positioned outside the washer vat wall so that water flows therefrom through said screen and over said dividing wall.

6. In a continuous flow pulp washer comprising a vat and an outflow chamber with a screen positioned vertically between said vat and said chamber, means for preventing the caking of pulp on the screen comprising an imperforate baffle plate positioned between the screen and the outflow chamber so that washing material flowing from the screen to the chamber must flow over the baffle plate.

7. An outlet casing for a continuous flow pulp washer comprising a vat, a box having three sides and a bottom, a screen placed across the fourth side thereof, said box being positioned across an opening in the wall of the vat with the screen across said opening, an outlet port in the bottom of said box and a baffle plate completely across the box between the screen and the outlet port so as to form two separate chambers.

8. An outlet casing for a continuous flow pulp washer comprising a vat, a box having three sides and a bottom, a screen placed across the fourth side thereof, said box being positioned across an opening in the wall of the vat with the screen across said opening, an outlet port in the bottom of said box and a baffle plate completely across the box between the screen and the outlet port so as to form two separate chambers, said baffle plate being of less height than the height of the sides of the box.

JAMES A. RHEINSTROM.